United States Patent [19]
Zink

[11] Patent Number: 5,297,668
[45] Date of Patent: Mar. 29, 1994

[54] CONVEYOR FOR RAISING AND LOWERING CONTAINERS INCLUDING MEANS FOR MANUALLY REMOVING CONTAINERS THEREFROM

[75] Inventor: Arden K. Zink, Louisville, Nebr.

[73] Assignee: Millard Mfg. Corp., Omaha, Nebr.

[21] Appl. No.: 84,419

[22] Filed: Jun. 29, 1993

[51] Int. Cl.$^5$ ............................................. B65G 35/00
[52] U.S. Cl. .................................... 198/724; 198/860.4
[58] Field of Search ................... 198/724, 735.4, 860.3, 198/860.4, 860.5

[56] References Cited

U.S. PATENT DOCUMENTS

| | | | |
|---|---|---|---|
| 1,758,994 | 5/1930 | Yeomans | 198/724 |
| 1,890,753 | 12/1932 | Scheurer | 198/724 X |
| 1,892,206 | 12/1932 | Dietz | 198/724 |
| 2,628,708 | 2/1953 | Wahl et al. | 198/212 |
| 2,777,567 | 1/1957 | Russell | 198/724 X |
| 3,261,453 | 7/1966 | Hirs | 198/724 |
| 3,295,666 | 1/1967 | Kay et al. | 198/212 |
| 3,306,432 | 2/1967 | Hoagland | 198/212 |
| 3,528,363 | 9/1970 | Creed | 198/724 X |
| 4,756,403 | 7/1988 | Sasaki et al. | 198/724 |

Primary Examiner—James R. Bidwell
Attorney, Agent, or Firm—Zarley, McKee, Thomte, Voorhees & Sease

[57] ABSTRACT

A vertical conveyor comprising a centrally rotatable column having a plurality of spaced apart container pusher bars extending therefrom. A helical container support bed extends around the central column and is positioned outwardly therefrom for supporting the lower ends of the containers being conveyed by the conveyor. A helical guide rail is positioned outwardly of the central column and is positioned above the support bed for preventing the containers from falling from the conveyor and for maintaining the containers in engagement with the pusher bars of the central column. A gate is provided in the guide rail near the lower end of the conveyor which may be manually opened should a line stoppage occur and it is necessary to remove the containers from the conveyor through the opening created when the gate is opened. A removable pin operatively connects the central column with the drive shaft therefor so that when the pin is removed, the central column may be manually rotated to cause the central column to successfully deliver the containers to be positioned adjacent the opening created by the open gate.

2 Claims, 4 Drawing Sheets

CONVEYOR FOR RAISING AND LOWERING CONTAINERS INCLUDING MEANS FOR MANUALLY REMOVING CONTAINERS THEREFROM

BACKGROUND OF THE INVENTION

1. Field of the Invention

This invention relates to a conveyor for raising and lowering containers and more particularly relates to such a conveyor having means for manually removing containers therefrom in the event of a line stoppage.

2. Background of the Invention

Many types of conveyors have been previously provided for raising or lowering cans, bottles, etc. from one location to another. Such conveyors are generally called vertical conveyors. When the conveyors are used to elevate articles from one location to a higher location, they are called elevating conveyors. When the vertical conveyors are used to lower articles from one location to a lower location, they are generally referred to as lowerators. For example, a device is described in U.S. Pat. No. 2,628,708 relating to an article raising or lowering conveyor. In the conveyor of the '708 patent, a centrally rotating column enclosed within a spiral or helical support bed is provided with the rotating column including an annular series of bars extending longitudinally along the length thereof to accommodate therebetween the inner side portions of containers to be raised or lowered. In the conveyor of the '708 patent, a supporting rail extends around the container support bed to restrain the containers in the conveyor.

Many other types of vertical conveyors have also been provided. For example, see U.S. Pat. No. 4,756,403. The vertical conveyors such as described above are frequently used in canning operations. In most canning operations, a continuous product flow system is utilized beginning with an empty can and ending when the product is cased. The operations such as filling, seaming, coding, washing, cooking and labeling are performed during this time using several machines. It is common for the line to stop because of a breakdown of any one of the machines in the production line.

The product being produced must complete the processing cycle uninterrupted to avoid spoilage. The processor normally has a contingency plan which takes effect in case of line stoppage to advance the product through the system. Such a procedure normally involves the manual removal of the product from the line and process it by other means.

If the production line should shut down, there will be product remaining in the vertical elevator which must be removed to finish the processing of the container. The removal of the containers from the vertical conveyor involves taking each container out of the vertical elevator at varying elevations. The number of containers would vary but normally would be over one hundred and could extend to twenty feet above the floor. Thus, it would be necessary for an operator to remove each of the containers at their varying locations which will obviously be time consuming. It is not possible for the operator to simply manually rotate the vertical conveyor since the conveyors are normally of a direct drive configuration.

SUMMARY OF THE INVENTION

Figure 1:
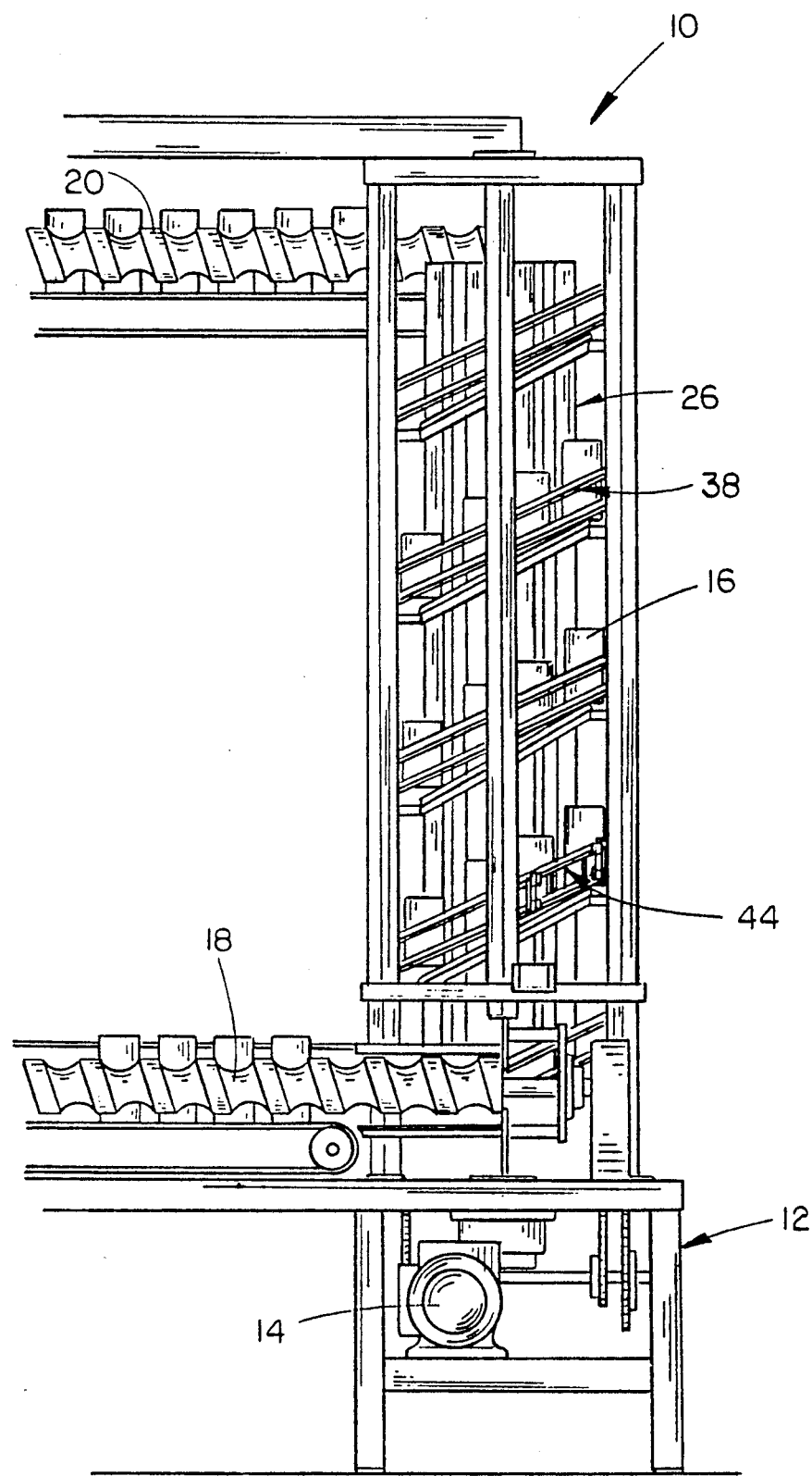
FIG. 1 is a side view of the vertical conveyor of this invention.

A vertical conveyor is disclosed which may be used to either raise or lower containers. A vertically disposed central column is rotatable about a vertical axis and has upper and lower ends. A spiral or helical support bed extends around the central column in a spaced apart relationship thereto for supporting the containers to be moved from the lower end to the upper end thereof or from the upper end to the lower end thereof. The spiral support bed has a top surface upon which the containers are supported. The table central column is provided with a plurality of pusher bars which extend outwardly therefrom for engagement with the containers so that rotation of the central column will cause the containers to move along the spiral support bed. A supporting rail of helical configuration is positioned at the outer end of the spiral support for maintaining the containers on the spiral support. A gate means is provided in the supporting rail adjacent the lower end thereof so that the containers may be manually removed from the conveyor in the event of a line stoppage. Means is provided for disconnecting the rotatable central column from its drive shaft so that the central column may be manually rotated to move the containers in the conveyor to the gate so that the containers may be removed from the conveyor.

DESCRIPTION OF THE PREFERRED EMBODIMENT

The numeral 10 refers to the vertical conveyor of this invention and generally includes a support means 12 having a drive motor 14. If the conveyor is used to elevate containers 16, an in-feed conveyor is provided to supply the container 16 to the lower end of the conveyor. When the conveyor 10 is used to elevate containers, an out-feed discharge conveyor 20 is positioned adjacent the upper end of the conveyor for receiving the containers which are elevated by the conveyor. If the conveyor is used to lower containers, there 20 will be an in-feed conveyor and conveyor 18 will be an out-feed or discharge conveyor.

Figure 3:
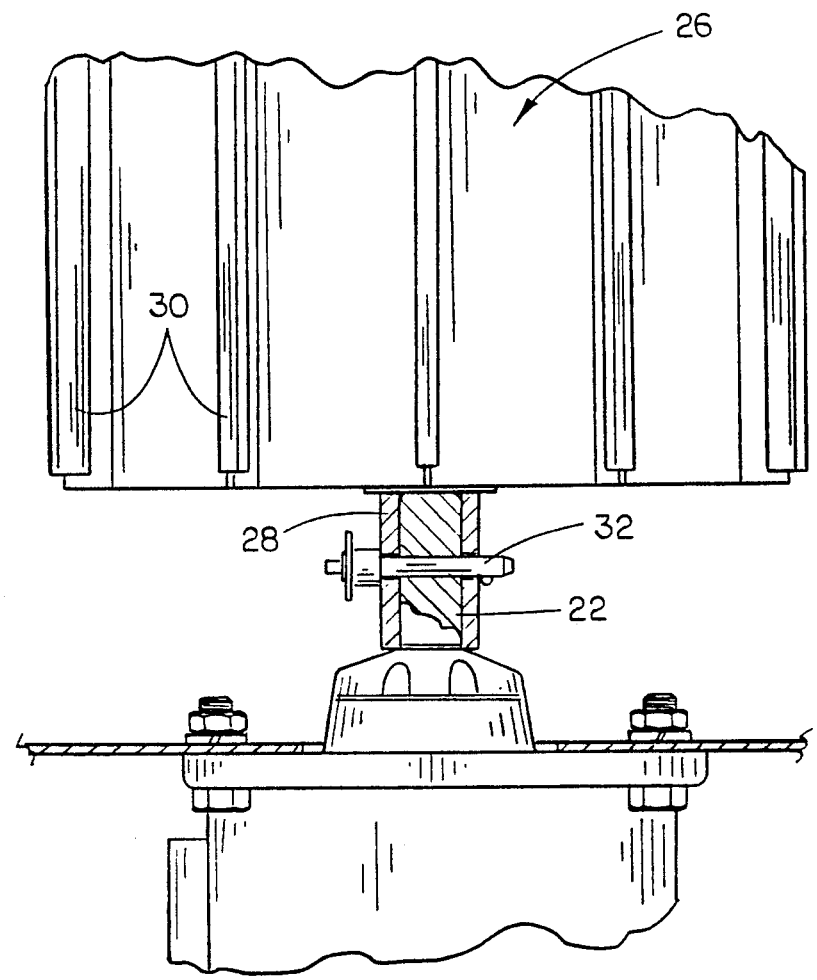
FIG. 3 is a side view of the lower portion of the vertical conveyor of this invention with portions thereof cut away to more fully illustrate the invention.

Drive motor 14 is operatively connected to a drive power shaft 22 having an opening 24 formed therein. A rotatable central column 26 having a downwardly projecting collar 28 at the lower end thereof is provided in the conveyor and includes a plurality of pusher bars 30 which are individually spaced on the external surface of the column 28 similarly to that described in U.S. Pat. No. 2,628,708. The spacing of the pusher bars 30 is such that the inner ends of the containers 16 may be received therebetween. A removable pin 32 extends through collar 28 and shaft 22 as seen in FIGS. 3 and 4 to positively connect the shaft 22 to the column 26.

The helical or spiral container support bed 34 is positioned outwardly of the central column 26 and supports the container 16 thereon in conventional fashion.

Figure 2:
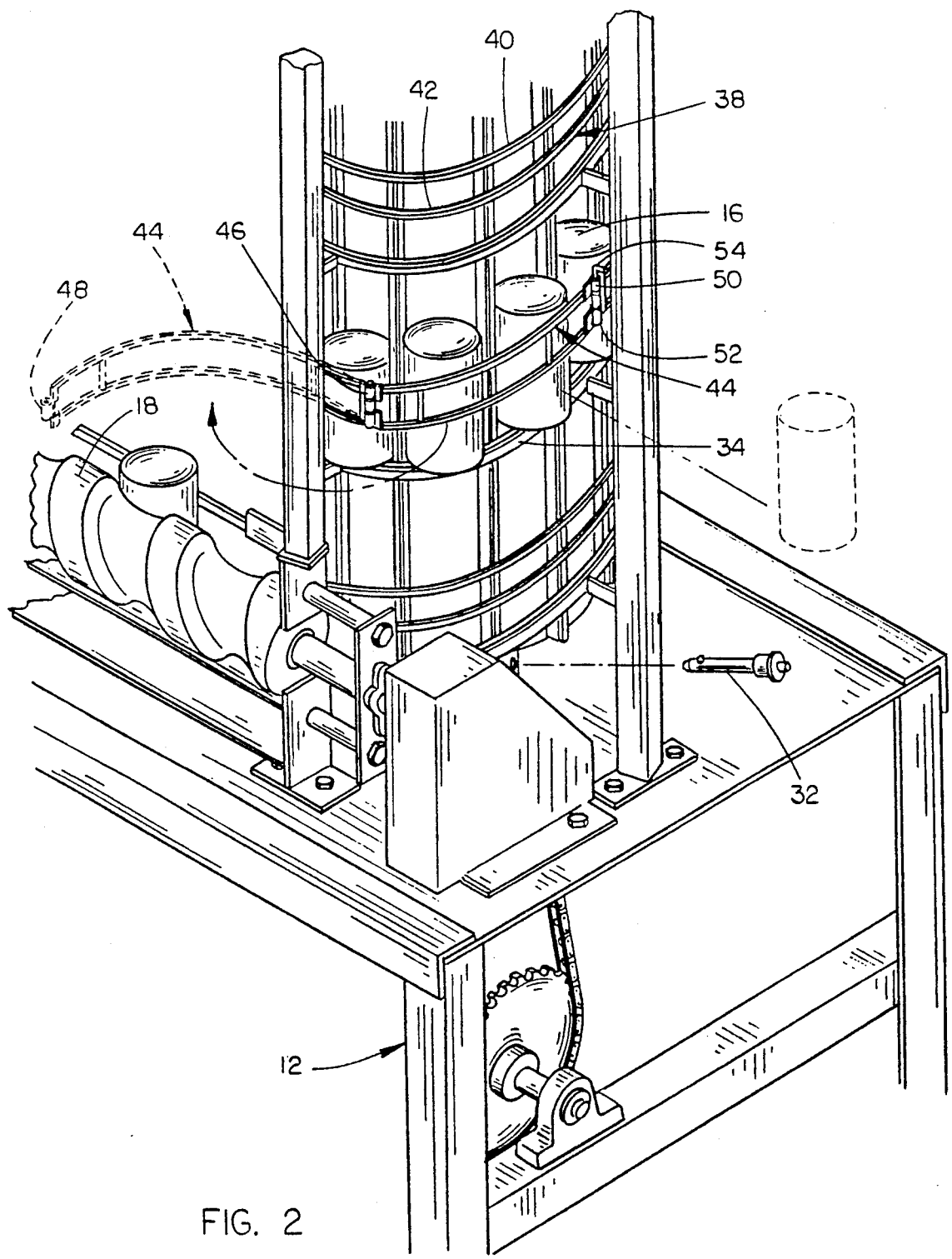
FIG. 2 is a perspective view of the lower portion of the vertical conveyor of this invention.

A helical support or guide rail is positioned outwardly of the central column 26 and above the support bed 34. Guide 38 is comprised of a pair of guide rails 40 and 42. A gate 44 is provided in the guide rail 38 adjacent the lower end of the conveyor as best illustrated in FIG. 2. Essentially the gate 44 is formed by removing a section of the rails 40 and 42 and providing a hinge 46 as seen in the drawings. The gate 44 is provided with a collar 48 at one end thereof which is adapted to be received between a pair of collars 50 and 52 secured to the rail 38. Pin 54 is designed to extend through the collars 50, 48 and 52 to maintain the gate 44 in its closed position during normal operating conditions.

Figure 4:
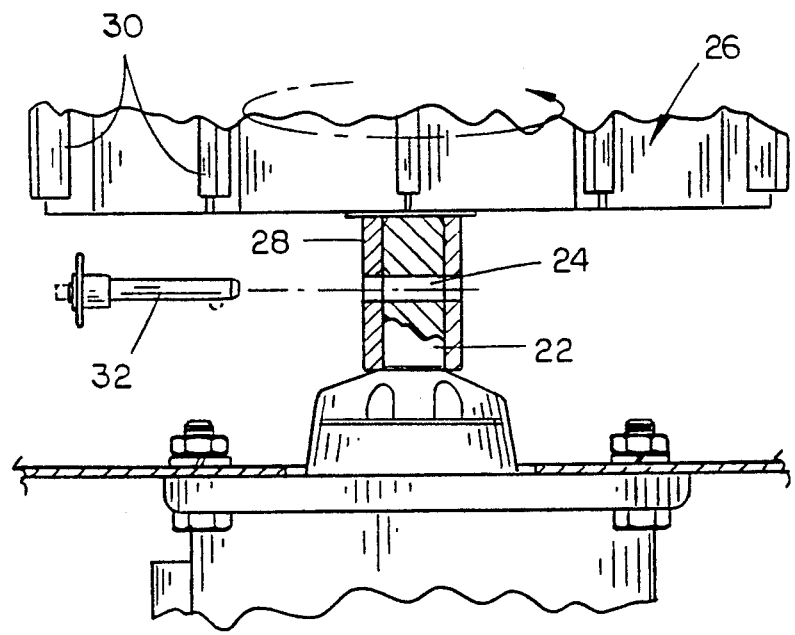
FIG. 4 is a view similar to FIG. 3 except that the retaining pin for the drive shaft for the central rotating column has been removed.
Figure 5:
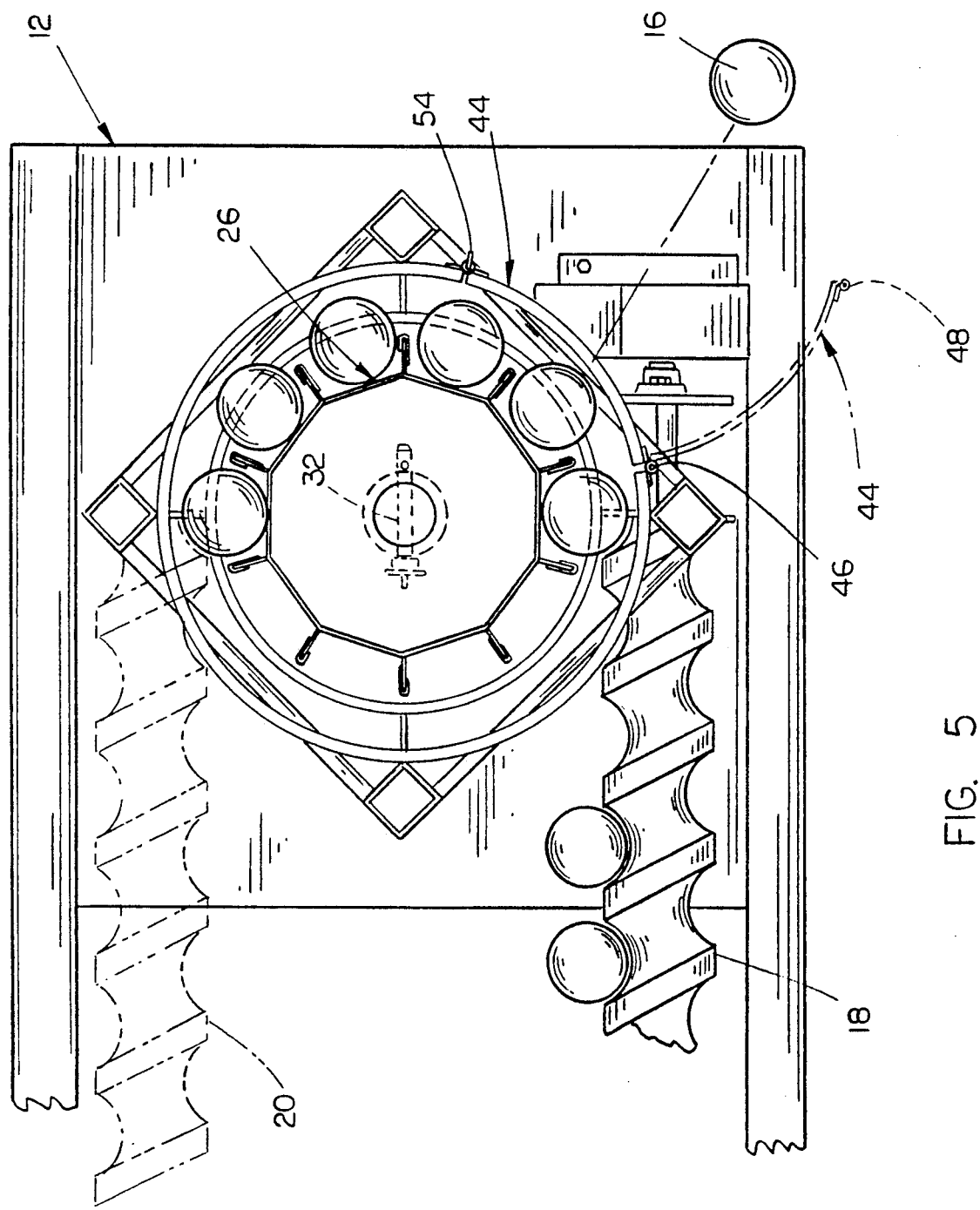
FIG. 5 is a top view of the vertical conveyor of this invention.

In the event that a line stoppage occurs and it is necessary remove the container 16 from the vertical conveyor 10, the pin 32 is removed from the shaft 22 and the collar 28 as seen in FIG. 4. Column 26 may then be manually rotated as desired. Gate 44 is then opened by removing the pins 54 as illustrated in FIG. 2 and pivoting the gate 44 to its open position. The containers 16 which are accessible through the open gate may be manually removed as illustrated by the broken lines in FIG. 2. The operator grasps the central column 26 and manually rotates the same to cause the column 26 to successively move the container 16 to the opening created by the opening of the gate 44.

Thus, the operator may easily remove the containers from the vertical conveyor by simply remaining in one position and manually rotating the column 26 and manually removing the containers 16 through the opening in the guide rail 38 as the containers are moved to the opening.

It can therefore be seen that the invention accomplishes at least all of its stated objectives.

I claim:

1. A vertical conveyor for conveying articles between vertically disposed locations, comprising:

a vertically disposed first support means rotatable about a vertical axis and having upper and lower ends;

a spiral support bed means having upper, lower, inner and outer ends extending around said first support means in a spaced-apart relationship for supporting the articles to be moved from the lower end to the upper end thereof or from the upper end to the lower end thereof, said spiral support bed means having a top surface upon which the articles are supported, drive means for rotating said first support means with respect to said spiral support bed means, means on said first support means for engaging the articles on said spiral support bed means whereby rotation of said first support means will cause the articles on said spiral support bed means to be moved along said spiral support bed means, a supporting rail means of helical form at the outer end of said spiral support bed means for maintaining the articles on said spiral support bed means as the articles are moved along the length of said spiral support bed means, and a gate means in said supporting rail means which is normally closed but which may be opened as desired to permit the removal therethrough of the articles on the spiral support bed means.

2. The vertical conveyor of claim 1 including means for disconnecting said first support means from said drive means so that said first support means may be manually rotated with respect to said spiral support bed means to position the articles thereon adjacent said gate means to facilitate the removal of said articles through said gate means.

* * * * *